Jan. 12, 1937. L. ALBISER 2,067,165
FISHING LINE FLOAT
Filed April 19, 1935
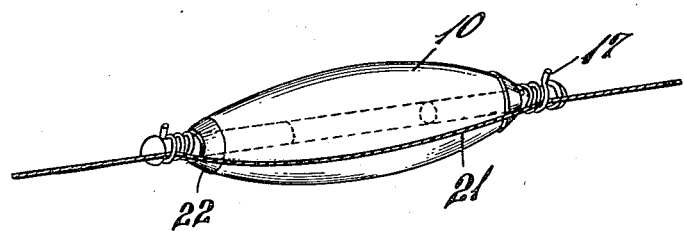
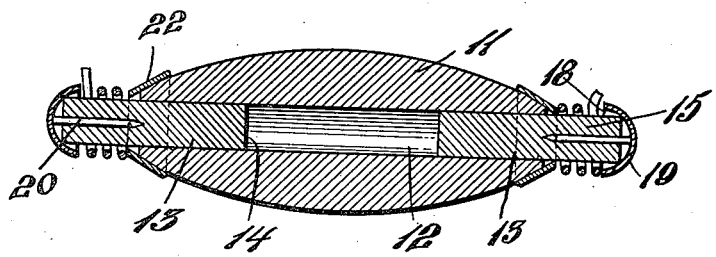
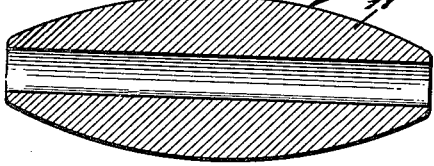
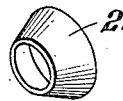
INVENTOR.
Louis Albiser
BY Barlow & Barlow
ATTORNEYS.

Patented Jan. 12, 1937

2,067,165

UNITED STATES PATENT OFFICE 2,067,165

FISHING LINE FLOAT

Louis Albiser, Providence, R. I., assignor to Shurkatch Fishing Tackle Co., a corporation of Rhode Island Application April 19, 1935, Serial No. 17,232

2 Claims. (Cl. 43—49)

This invention relates to a float for a fishing line; and has for one of its objects the provision of means by which it may be readily secured to a fishing line.

Another object of the invention is the provision of a simple and improved means for holding the line securing element in position on the stem of the float.

Another object of the invention is the provision of a line securing device on the stem of the float which may rotate about the stem.

Another object of the invention is the provision of a line securing means which does not depend upon any resiliency for holding it in position on the stem of the float.

Another object of the invention is the provision of a stem which may be formed of less expensive material and one which may utilize short lengths of material which might otherwise be considered scrap.

With these and other objects in view, the invention consists of certain novel features of construction, as will be more fully described, and particularly pointed out in the appended claims.

In the accompanying drawing:

Fig. 1 is a perspective view of the float attached to a fishing line;

Fig. 2 is a central longitudinal section thereof;

Fig. 3 is a sectional view of the body portion of the float;

Fig. 4 is an elevation of the stem portion of the float;

Fig. 5 is an elevation of the helically coiled line securing device;

Fig. 6 is an elevation of an abutment used in the end of the stem to prevent the helically coiled wire from becoming detached from the stem;

Fig. 7 is a perspective view of the ferrule on the float.

Referring to the drawing in more detail, 10 illustrates the body portion of my float which is formed of some material lighter than water, usually cork, the same being solid, as shown at 11 in the sectional views, Figures 2 and 3. The central longitudinal bore 12 extends lengthwise through this body and in this bore are mounted stems 13 to protrude beyond the ends of the body, the inner ends 14 of these stems being spaced in the bore as illustrated in Figure 2, and secured in this position by some suitable cement or other desired securing means. By mounting these stems in this manner, very short dowels may be used, which are usually considered as waste because of their reduced length, instead of a dowel which is of a length from the outer tip of one stem to the outer tip of the opposite stem as would be necessary without this provision, thus I may utilize a very inexpensive dowel.

A metal ferrule 22 snugly fits about the end of the float and is held in position by the helical wire 16. It serves to cover any imperfection in the lacquer at the end of the hole and maintains a better appearing float.

The end portions 15 of the stems which extend beyond the body are equipped with a helically coiled wire 16 which has an inner diameter slightly larger than that of the outer diameter of the stem so as to loosely and rotatably fit thereon, while one end of the wire extends laterally from the stem so as to provide a convenient catch 17 for passing the fishing line into the coil of the wire. The helical wire is secured in place by some suitable abutment provided at the end of the stem, the abutment surface being designated as 18 and here shown as the head 19 of a tack or suitable nail having an enlarged head with a shank portion 20 which may be driven into the stem 13, usually formed of wood, for convenient securing of the helical wire against removal.

This helical wire being rotatably mounted upon both stem portions enables a fishing line designated 21 to be easily secured to the float by merely slipping its portion beneath the catch 17 and passing it one revolution about the stem. This may be done at both ends to hold the float securely attached to the line. The swelling or shrinking of the dowel because of the loose fit of the helically coiled wire will not affect the line attaching device mounted in this manner.

The float will be suitably painted in any desired colors which is customary in articles of this character.

The foregoing description is directed solely towards the construction illustrated, but I desire it to be understood that I reserve the privelege of resorting to all the mechanical changes to which the device is susceptible, the invention being defined and limited only by the terms of the appended claims.

I claim:

1. In a fishing line float, a body, a stem extending therefrom, a helically arranged wire loosely embracing said stem, and an abutment having a shank portion extending into the end portion of the stem for preventing removal of said wire.

2. In a fishing line float, a body, a stem extending therefrom, a helically arranged means loosely embracing said stem with an end extending laterally therefrom, and an abutment having a shank portion extending into the end portion of the stem for engaging said laterally extending end and preventing removal of said wire.

LOUIS ALBISER.